Dec. 25, 1934.  H. C. DAVIS  1,985,444
WHEEL CHAIN
Filed Jan. 11, 1934
Fig. 1.
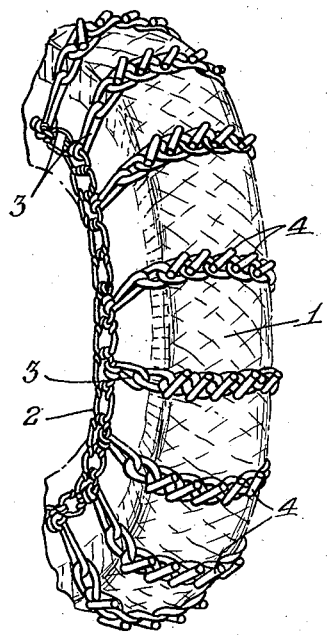
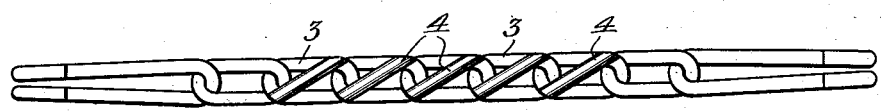
Fig. 2.
Fig. 3.
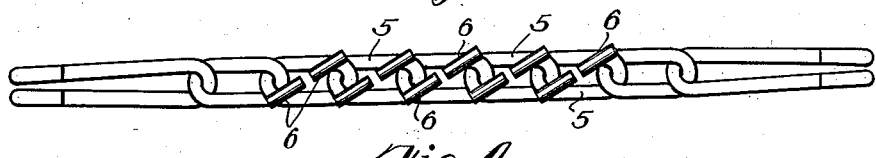
Fig. 4.
Inventor
Howard C. Davis
By E. H. Bond
Attorney Patented Dec. 25, 1934

1,985,444

UNITED STATES PATENT OFFICE 1,985,444

WHEEL CHAIN

Howard C. Davis, Lancaster, Ohio

Application January 11, 1934, Serial No. 706,269

2 Claims. (Cl. 152—14)

This invention relates to certain new and useful improvements in link chains for use in connection with automobile's tires and has for its object among others to provide an improved chain, having for one of its objects to provide a chain having reinforcing bars of such a nature and relative arrangement as to avoid injury to the surface of the road as is the case in known forms. The bars can be made, from round, half-round, or flat stock of substantially the same size stock as the link in the chain. The reinforcing bars are not necessary on all the links, having been found sufficient if applied to only those having ground contact, and the number of such bars should vary, that is, using more or less as circumstances may require.

Among other advantages of this form of bar is that it reinforces the link where the breakage usually takes place, resulting from the pounding on the hard road surface, causing the links to break on the corner, and the loose ends to fly against the fenders.

Other objects and advantages of the invention will be hereinafter more fully set forth and clearly described in connection with the drawing.

Other objects and advantages of the invention will hereinafter appear, and the novel features thereof will be particularly pointed out in the appended claims.

The invention, in its preferred forms, is clearly illustrated in the accompanying drawing, which, with the numerals of references marked thereon, form a part of this specification, and in which Figure 1 is a perspective view of a portion of a tire equipped with my improved form of link chain.

Figure 2 is a plan view of one of the chains, upon an enlarged scale.

Figure 3 is a side elevation of Figure 2.

Figure 4 is a plan view similar to Figure 2, showing the tread bars bridging the links in a diagonal direction, over the longitudinal part of the link and over the raised portions of the links.

Like numerals of reference indicate like parts in the several views.

Referring to the drawing:

1 designates a portion of an automobile tire, shown in perspective, with a series of longitudinal chains 2, the chains being connected by a multiplicity of links 3 of the general character shown in Figure 2. It is to be understood, however, that the chains may be of the character shown in Figure 4, if desired, the general result being substantially the same, and produced in substantially the same manner.

The chain shown in Figure 2 is provided with the tread bars 4 which extend diagonally crosswise of the longitudinal part of the link, being arranged at raised portions of the link, and extending substantially crosswise of the centre of the links, in a substantially crosswise substantially diagonal direction from the centre of the link, over the longitudinal portion of the link at the raised portions.

It is to be understood that the character of the links 3 may be varied without departing from the spirit of the invention, as the links may be of any desired character and to which may be applied the preferred form of the tread bars.

Figure 4 shows substantially the same structure and arrangement of parts as above described, but showing the tread bars bridging the link in a diagonal direction.

It will be understood that the forms shown in Figures 1, 2 and 3 embody the same generic idea; both forms embody bars extending from opposed points, the one being continuous and the other having one short bar over the bend or high part of the link, there being two bars on each link, and spaced from each other.

In the form shown in Figure 4, the bars extend over the underlying part of the link to prevent interlocking of each other when not in service.

Modifications in detail may be resorted to without departing from the spirit of the invention or sacrificing any of its advantages.

By my improved construction and arrangement of links I attain new and better results than can be obtained from prior constructions of this general character. I have found from actual experience that a chain of this general character wherein there are two bars on each side in direct alinement with each other at opposite points or bends of the link spaced apart, reduces the flexibility of the link for the reason that these bars cannot pass each other. The greater portion of the bars extend over the inside portion of the link to prevent interlocking. Also, with the bars being spaced it prevents sidewise slipping of the wheel, as the ends of the bars hold in soft surfaces, which also provides twice the usual number of ends to stop side slipping of the wheel. Two bars on each link give better gripping surface, as it has been demonstrated that being in direct alinement with each other the bars resist sidewise slipping as the ends of the bars catch the skid in soft surfaces from the center as well as the side ends of the link. This resistance from the center is new with me.

What is claimed as new is:

1. An anti-skid cross chain composed of interconnected links, each link twisted so that said links lie in approximately a common plane, and bar-like calks welded to the outer sides of the projecting portions of the links formed by the twisting thereof, there being a bar to each of said projecting portions and the longitudinal axes of which are in alinement with each other.

2. An anti-skid cross chain as claimed in claim 1, in which the bar-like calks are spaced apart and extend towards each other to overlie the space defined by the material of the links.

HOWARD C. DAVIS.